July 5, 1960
N. ANTON
2,944,176
RADIATION DETECTOR
Filed July 13, 1953
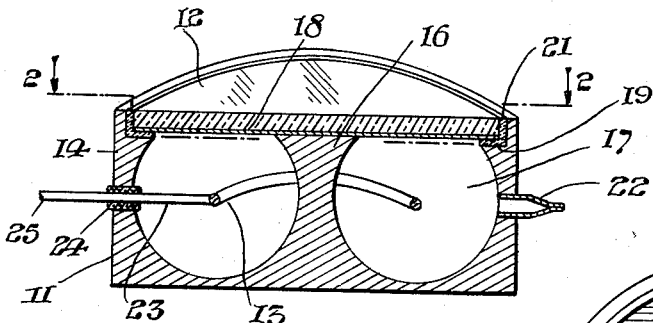
Fig.1.
Fig.2.
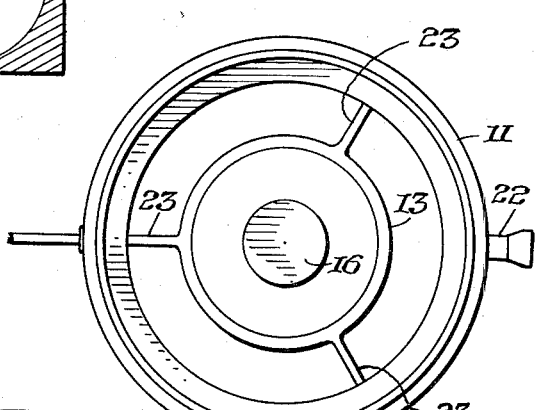
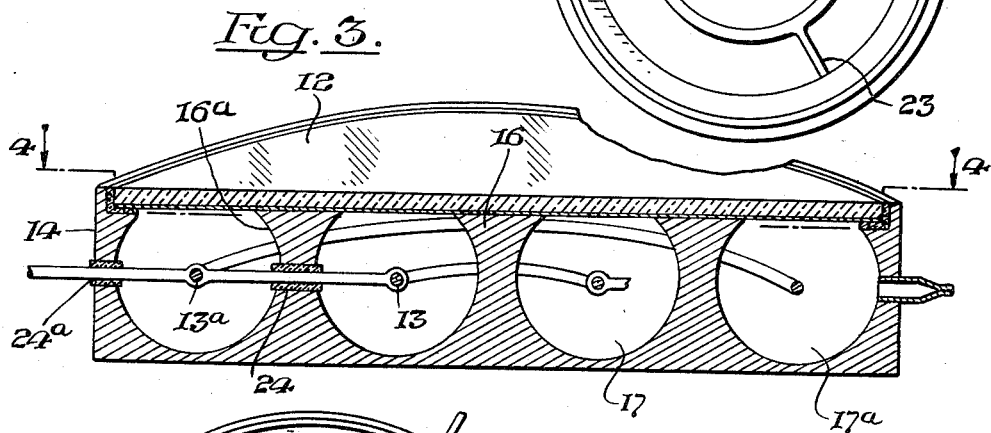
Fig.3.
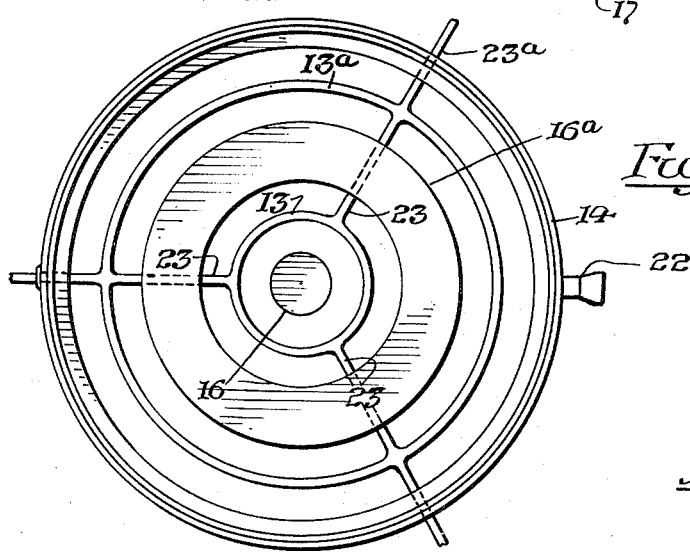
Fig.4.
INVENTOR
Nicholas Anton
BY
Darby & Darby
ATTORNEYS

United States Patent Office 2,944,176
Patented July 5, 1960

2,944,176
RADIATION DETECTOR

Nicholas Anton, 1226 Flushing Ave., Brooklyn, N.Y.

Filed July 13, 1953, Ser. No. 367,669

11 Claims. (Cl. 313—93)

The present invention is related to the art including detectors of corpuscular electromagnetic radiation and is particularly concerned with alpha and beta ray detectors of the proportional and Geiger counter types.

A customary form of radiation detector particularly suitable for alpha and/or beta measurement is in the form of a metallic housing with a radiation-permeable window in one wall and containing a gas or vapor adapted to be ionized by incoming radiation passing through the window. An electrode is located within the housing and an electric field is impressed between the electrode and the housing, the electrode serving as a collector of ions generated by the radiation. The present invention is concerned with improvements in this type of radiation detector.

Alpha rays are swiftly moving atoms of helium stripped of their orbital electrons. The alpha rays emitted by radioactive decay of heavy elements have initial velocities of three percent to six percent of the velocity of light, which is equivalent to initial kinetic energies of 2 to 8 mev. Higher energy alpha rays can be obtained by artificial acceleration. Alpha rays expend their energy by ionizing internally the matter through which they travel. Their mean range in standard air is approximately 1.5 to 7.5 centimeters. The range in solids or liquids is much shorter and is usually expressed in thicknesses equivalent to one centimeter of air. For convenience, these thicknesses are often given in milligrams per centimeter. The air equivalent of aluminum is 1.62 mg./cm.$^2$, of mica 1.4 mg./cm.$^2$, of gold 1.6 mg./cm.$^2$. It can be seen, therefore, that a mica film of 3.5 mg./cm.$^2$ will completely absorb all alpha particles of energies less than 2.5 mev. Assuming the density of mica to be 2.8, a 3.5 mg./cm.$^2$ sheet is only .0005 inch thick.

Beta rays are high speed electrons spontaneously emitted by the atoms of radioactive materials. Beta particles emitted by a radioactive substance do not have uniform velocities, but their energies range from zero to a maximum and comprise a spectrum which is specific to each material. One of the most useful of the common radioactive isotopes is carbon 14 because of its extremely long half-life. The maximum energy of carbon 14 beta particles is .154 mev. and their average energy is .050 mev.

Beta rays expend their energies by ionizing the medium through which they travel. Roughly speaking, their absorption depends upon the number of atoms the beta ray is passing in the material. In a square centimeter of any material having the same weight there are about the same number of atoms. For this reason, absorptive thicknesses are usually referred to in milligrams per centimeter without mention of the material if the elements have compositions of low atomic number. An absorber of 1.4 mg./cm.$^2$ will transmit 20% of impinging beta particles of .050 mev. average energy, while an absorber of 4 mg./cm.$^2$ will transmit only 1.5% of them. An absorber of 1.4 mg./cm.$^2$ will transmit 68% of impinging beta particles of .154 mev. energy, while an absorber of 4 mg./cm.$^2$ will transmit only 33% of them.

From the above, it is very apparent that one of the most important requirements of an alpha and/or beta counter is an extremely thin envelope (or section of it, such as a window) which will permit the entry of the greatest possible number of charged particles into its ionizable interior atmosphere.

It is well known that radioactive decay is a statistical phenomenon. The accuracy of the count depends therefore upon the total number of particles counted. When the level of radioactivity is low, such as an average emission of a few particles per square centimeter per minute, and the desired accuracy is high, it is necessary to cover with the counter as large a surface of the emitter as possible. This last requirement, i.e. a large counter, creates difficulties because of the background count which is due to cosmic rays, natural gamma rays, emission from surrounding materials, contamination or the like. An efficient alpha and/or beta counter should possess a large and extremely thin window and a ratio of window surface to counter volume as high as possible, which in turn decreases the effect of the background count. Long tedious hours of counting are necessary in biological tracer work to separate background count from the desired count when conventional counters are used.

Common forms of window materials used in so-called end or side window detectors are organic films, metallic films or thin mica splittings. Organic films can be obtained in thicknesses which measure only a few microns. These films suffer from the disadvantage of being very weak, of being usually affected by moisture, of being unable to withstand temperatures in excess of 100° C., and of being dissolved by some of the desirable quenching gases used within the envelope. Together with other non-conductive films, they allow a charge to build up on them which can cause spurious counts to be generated in the tube.

Metal foils, while not exhibiting most of the objectionable features listed above, cannot be obtained thin enough to be usable in the measurement of low energy beta rays while maintaining vacuum tightness. Aluminum and aluminum alloy films thinner than .0003 inch have been found to be too porous for use. Although it is usually possible to find a few pieces of satisfactory .0003 inch thin disks one centimeter in diameter out of several hundred, it is impossible by present practice to obtain thinner or larger windows.

Mica, whether natural or artificial, can be split into extremely thin sheets. By careful handling, sheets 6 inches in diameter and only .0003 inch thick or ⅜ inch disks only .00006 inch thick can be obtained. These windows, although very delicate, are sufficiently strong to be handled. However, they cannot withstand pressure differentials required by conventional end mica window counters and necessary for sealed-off operation, and are commonly used only in the so-called free flow counters. Conventional mica window tubes suffer from the disadvantage that in use an electrostatic charge collects on the window surface, seriously distorting the field within the counter, which makes the counter unreliable and sometimes inoperative.

The disadvantages of the conventional mica window detector are overcome by the present invention which includes a number of separate features advantageous separately or in combination to improve the construction and operation of radiation detectors of the present type.

According to the present invention the window (of mica or other material which may have relatively low strength) is coated in suitable manner, on both sides or only on the inside surface if desired, as by sputtering or evaporating, with a metal film which is made so thin as to have substantially no effect on the permeability of the window to the radiation to be detected. In addition, the casing is provided with a central internal electrically conducting post which extends generally coaxial to the casing to provide both a support for the window at its center and an electrical connection which joins the film to the cathode envelope forming, thus, for electrostatic purposes a closed container. As a further feature, the casing is especially formed so that with its central post or stud it has an internal enclosed space substantially in the shape of a toroid, and the internal electrode is formed as a ring or circular wire symmetrically located within the toroidal space, whereby a highly uniform electric field is provided. In some instances, where much larger detectors are desired, the central post may be supplemented by a group of concentric cylinders to provide a plurality of supporting structures for the window, which can then be relatively thin and weak. In such case a ring-shaped electrode is located between the center post and the adjoining supporting cylinder, or between each adjoining pair of cylinders, or between the outermost cylinder and the casing wall.

The construction, advantages, and objects of the present invention will become more apparent from consideration of the following detailed description of the preferred embodiments of the invention, taken in conjunction with the appended drawing, in which:

Figure 1 is a longitudinal cross-sectional perspective view of one form of the invention;

Figure 2 is a top view of the device of Figure 1 with the window removed and viewed along line 2—2 of Figure 1;

Figure 3 is a longitudinal cross-sectional perspective view of a larger form of detector according to the present invention; and Figure 4 is a top view of the device of Figure 3 with the window removed and viewed along line 4—4 thereof.

Figures 1 and 2 illustrate a simple form of radiation detector according to the present invention. This detector comprises an electrically conductive housing or casing 11 open at one end with a window 12 thereacross and having a ring electrode 13 insulatedly supported within the casing 11. The casing 11 is formed generally of cylindrical shape with an outer wall 14 and a center post or supporting stud 16 extending axially within outer wall 14. The outer wall 14 and the stud 16 are formed so that the space 17 enclosed by the casing 11 and stud 16 is of substantially toroidal form. For example, the casing 11 may be formed of a solid cylindrical block of metal having the toroidal space 17 machined out therefrom. The casing 11 is preferably of metallic material, such as No. 446 stainless steel.

The window 12 is formed of a thin radiation-permeable material which can be coated with a metallic film. It is preferably of mica but may be formed of nylon, cellophane or other synthetic plastic of preferably low molecular weight. In the following, it will be assumed for illustrative purposes that the window is of mica. A thin metallic coat 18 is applied to the inner face of the window 12 before its assembly with the casing 11. This metallic coat is of any suitable material which will not chemically combine with the gas or vapor which may be used within the casing, such as alcohol, ether, chlorine, bromine or other substance. For example the coating may be of chrome-iron, chromium, platinum or other suitable metal. It may be applied by sputtering or evaporating or by painting in emulsion form. The window 12 is made as thin as is mechanically possible with the type of construction and dimension used.

A ring or circular-shaped electrode 13 is symmetrically located within the casing 11 so that in cross-section the electrode 13 is centrally located with respect to the generating circle of the toroidal space 17. In this way maximum symmetry of electric field is obtained. The electrode 13 is supported from the casing 11 in any suitable desired manner. Thus, as illustrated, the electrode 13 is provided with a plurality of equally spaced supporting rods 23 extending radially outwardly therefrom. Each of these rods 23 is mounted in the outer casing wall 14 in an insulating bushing 24 formed of Alsimag or other similar insulating sealable material. One or more of the supporting rods 23 extends completely outwardly of the casing 11 to form a terminal 25. While three insulating bushings 24 and supports 23 are shown, it will be understood that any desired number may be utilized. In particular, for a small detector, a single support may prove to be adequate.

It will be seen that the casing 11 is also provided with a recessed ledge or shoulder 19 extending just inside the open face of the casing 11, in which the window 12 rests. In assembly, the edge of the window is painted with a suspension of glass powder in water. The glass is selected to have the same coefficient of expansion as mica and as the metal of the casing. For example, the glass may be Corning 7570 or Kimbal R6. The electrode 13 is also then placed in position with the bushings 24 in place. The assembly is then fired at approximately 650° centigrade, which fuses the powdered glass and joins it to both the mica window and to the metal casing to provide a seal shown at 21 in Figure 1. As shown in this figure the ledge 19 is slightly depressed relative to the top of the post 16, so that upon sealing and upon evacuation of gas or vapor filling the post 16 is in contact with the coating 18 on window 12. At the same time the Alsimag bushings 24 are also sealed to the supports 23 and to the casing 11. It will be seen that the post 16 conductively connect the film 18 to the casing 11, even though the seal 21 may offer insulation.

An exhaust tubulation 22 is provided in the casing 11 to permit the air therewithin to be exhausted and any desired vapor or gas to be enclosed within the casing, whereupon the tubulation 22 is sealed off to retain the desired condition of gas or vapor pressure in the casing.

Figures 3 and 4 show a modified form of the present invention suitable for larger size detectors. The construction here is essentially similar to that of Figures 1 and 2, except that for a larger size window 12 a further support and charge-dissipating path is provided in the form of a generally cylindrical window support 16a located between the central stud 16 and the casing wall 14. Also the support 16a as well as the central stud 16 and the outer wall 14 are formed or fabricated to provide a plurality of toroidal spaces 17, 17a, and each such toroidal space contains its own ring electrode 13, 13a symmetrically located therewithin. The innermost ring electrode 13 is supported from its adjoining cylindrical stud 16a by the supporting rods 23 as in Figure 1 while the outermost electrode 13a is similarly supported by supports 23a. One or more of the supports 23 may extend to ring electrode 13a. It will be understood that the supports 23, 23a may be suitably spot welded or soldered to the rings 13, 13a after they are located within the spaces 17, 17a. Insulating bushings 24, 24a are utilized in a fashion similar to Figures 1 and 2. It will be understood that where supports 23 are fixed to electrode 13a and sufficient rigidity of support exists, it is unnecessary to utilize the innermost bushings 24. The construction and assembly of this form of the invention is otherwise similar to Figures 1 and 2.

While the form of the invention shown in Figures 3 and 4 is illustrated as having two concentric toroidal spaces 17, 17a, it will be understood that the same system can be extended to any desired larger number of such toroidal spaces, the only requirement being that sufficient support be given to the window 12.

While the present invention has been illustrated as utilizing toroidal spaces 17, 17a, in some circumstances it may be advantageous to simplify the construction of these detectors, in which case the post 16 may be a solid right cylinder. The inner wall of the casing 14 may be also a right circular cylinder and any intermediate supporting cylinder such as 16a may also be a thin-walled right circular cylinder. Also, other desired forms than cylindrical may be used for the detector. Furthermore, while it is preferred to fabricate the casing and window supports integrally from a single metallic block, it will be understood that the casing and supports may be formed in any desired and convenient number of separate parts which can be suitably secured together as by soldering, welding, brazing, fusing, or the like, to provide a complete casing with all parts electrically interconnected.

While the above invention has been described particularly with respect to insulated windows made conductive by a metallic coating, it may also utilize thin metallic film windows, in which the center post such as 16 and supports such as 16a permit use of much thinner films without reducing mechanical strength.

It is further to be understood that the above description is simply illustrative of the present invention. Since many other apparently widely differing constructions may be readily conceived without departing from the spirit of the present invention, the above description is not to be construed in a limiting sense and the scope of the invention is defined solely by the appended claims.

What is claimed is:

1. A radiation detector comprising a conductive casing having an opening, a radiation-permeable non-conductive window sealed across said opening, a conductive coating on said window and insulated from said casing at its periphery, and a conductive support for an inner portion of said window connecting said coating to said casing.

2. A radiation detector comprising a conductive casing having an opening, a thin radiation-permeable window having at least one surface of conductive material insulatedly mounted across said opening, and a conductive support for an inner portion of said window.

3. A radiation detector comprising a conductive casing having an opening, a radiation-permeable non-conductive flexible window insulatedly sealed across said opening, a conductive coating on said window separated from said casing at the edges of said opening and a conductive support for a central portion of said window within and secured to said casing and forming an electrical connection between said coating and said casing for dissipating charges accumulated on said window.

4. A radiation detector comprising a casing having an open wall, a central post within said casing and extending perpendicularly to said open wall to form an annular chamber between said post and the walls of said casing and a thin flexible window across said wall, said post serving to support the inner surface of said window centrally thereof.

5. A radiation detector comprising a conductive casing having an open wall, a central conductive post within said casing and extending perpendicularly to said open wall to form an annular chamber between said post and the walls of said casing, and a thin non-conductive window sealed across said open wall and in contact with and supported by said post, said window having a conductive coating on its face in conductive contact with said post, whereby said coating and post dissipate charges accumulated on said window.

6. A radiation detector comprising a conductive casing having an opening at one end and a conductive post extending generally axially internally of said casing, said casing and post having a form bounding a substantially toroidal space, a circular electrode symmetrically located in said space and insulated from said casing and post, and a radiation-permeable window across said opening.

7. A radiation detector comprising a conductive casing having an opening at one end and a conductive post extending generally axially internally of said casing, said casing and post having a form bounding a substantially toroidal space, a circular electrode symmetrically located in said space and insulated from said casing and post, and a radiation-permeable window across said opening, said window being of non-conductive material and bearing a conductive coating, said coating being in contact with said post whereby said post serves to support said window and to dissipate any charges accumulated on said window.

8. A radiation detector comprising a hollow conductive casing having an opening, a thin window extending across said opening, and a plurality of supports for said window mounted within said casing and conductively contacting said window at portions spaced from the edge of said opening, said casing and supports having forms providing a plurality of toroidal spaces within said housing.

9. A detector as in claim 8, wherein said window is of non-conductive material bearing a conductive coating not electrically connected at its edges to said casing, and wherein said supports are of conductive material interconnecting said coating and said casing.

10. A detector as in claim 9, wherein said supports comprise a center post unitary with said casing and at least one cylindrical support unitary with said casing and coaxial but spaced radially from said center post.

11. A radiation detector comprising a hollow conductive casing having an opening, a thin window extending across said opening, said window being of non-conductive material bearing a conductive coating, a plurality of supports for said window mounted within said casing and contacting said window at portions spaced from the edge of said opening, said supports being of conductive material inter-connecting said coating and said casing and comprising a center post unitary with said casing and at least one cylindrical support unitary with said casing and coaxial but spaced radially from said center post, said casing and supports having forms providing a plurality of concentric toroidal spaces, and a circular electrode symmetrically located in each of said spaces.

References Cited in the file of this patent

UNITED STATES PATENTS

| 2,474,851 | Liebson | July 5, 1949 |
| 2,612,615 | Fehr et al. | Sept. 30, 1952 |
| 2,740,900 | Ruble et al. | Apr. 3, 1956 |
| 2,742,586 | Friedman | Apr. 17, 1956 |

OTHER REFERENCES

Geiger-Counter Tubes, Friedman, Proceedings of the I.R.E., vol. 37, #7, July 1949, pp. 804–5.